(12) United States Patent
O'Bannon et al.

(10) Patent No.: US 10,328,823 B2
(45) Date of Patent: Jun. 25, 2019

(54) ADJUSTABLE SEAT ASSEMBLY

(71) Applicant: Lear Corporation, Southfield, MI (US)

(72) Inventors: Terry O'Bannon, Royal Oak, MI (US); Michelle A. Pereny, Farmington Hills, MI (US); Samuel R. Hanlon, Livonia, MI (US); Ashford Allen Galbreath, Troy, MI (US); Gerald Patrick, Shelby Township, MI (US); Karl Henn, New Hudson, MI (US)

(73) Assignee: Lear Corporation, Southfield, MI (US)

( * ) Notice: Subject to any disclaimer, the term of this patent is extended or adjusted under 35 U.S.C. 154(b) by 0 days.

(21) Appl. No.: 14/560,436

(22) Filed: Dec. 4, 2014

(65) Prior Publication Data

US 2015/0352979 A1  Dec. 10, 2015

Related U.S. Application Data

(60) Provisional application No. 62/009,585, filed on Jun. 9, 2014.

(51) Int. Cl.
   *B60N 2/00* (2006.01)
   *B60N 2/806* (2018.01)
   (Continued)

(52) U.S. Cl.
   CPC .......... *B60N 2/0248* (2013.01); *B60N 2/002* (2013.01); *B60N 2/16* (2013.01); *B60N 2/806* (2018.02); *B60N 2002/0268* (2013.01)

(58) Field of Classification Search
   None
   See application file for complete search history.

(56) References Cited

U.S. PATENT DOCUMENTS

| 4,477,874 A | 10/1984 | Ikuta et al. |
| 4,679,855 A | 7/1987 | Hattori et al. |

(Continued)

FOREIGN PATENT DOCUMENTS

| CN | 1087804 A | 6/1994 |
| CN | 1731102 A | 2/2006 |

(Continued)

OTHER PUBLICATIONS

U.S. Appl. No. 14/575,474, entitled "Adjustable Seat Assembly", filed Dec. 18, 2014, 26 pages.

(Continued)

*Primary Examiner* — Jonathan M Dager
*Assistant Examiner* — Garrett F Evans
(74) *Attorney, Agent, or Firm* — Brooks Kushman P.C.

(57) ABSTRACT

A seat assembly is provided with a translatable seat cushion, a pivotal seat back, and a head restraint adapted to be mounted for translation adjacent the seat back. An actuator is operably connected to at least one of the seat cushion and the seat back for adjustment of a plurality of settings of the seat assembly. A controller is in electrical communication with the actuator and is configured to receive input indicative of occupant anthropometry data, current physical condition and/or activity level, compare the input with predetermined data ranges, and adjust at least one of the plurality of settings of the actuator to a predetermined setting based on the predetermined range. A computer-program product is programmed for automatically adjusting a seat assembly. A method for adjusting a seat assembly receives anthropometry data for an occupant.

11 Claims, 6 Drawing Sheets

(51) Int. Cl.
  *B60N 2/02* (2006.01)
  *B60N 2/16* (2006.01)

(56) References Cited

U.S. PATENT DOCUMENTS

| | | | |
|---|---|---|---|
| 5,019,759 A * | 5/1991 | Takemura | B60N 2/0244 307/10.1 |
| 5,707,109 A | 1/1998 | Massara et al. | |
| 5,758,924 A | 6/1998 | Vishey | |
| 5,822,707 A * | 10/1998 | Breed | B60R 25/25 701/49 |
| 5,967,608 A | 10/1999 | Van Sickle | |
| 5,975,633 A | 11/1999 | Walk et al. | |
| 6,088,642 A | 7/2000 | Finkelstein et al. | |
| 6,088,643 A | 7/2000 | Long et al. | |
| 6,129,419 A | 10/2000 | Neale | |
| 6,203,105 B1 * | 3/2001 | Rhodes, Jr. | A47C 4/54 297/284.6 |
| 6,220,667 B1 | 4/2001 | Wagner | |
| 6,227,563 B1 | 5/2001 | Talisman | |
| 6,273,810 B1 | 8/2001 | Rhodes, Jr. et al. | |
| 6,289,538 B1 | 9/2001 | Fidge | |
| 6,392,550 B1 | 5/2002 | Najor | |
| 6,398,303 B1 | 6/2002 | Herrmann et al. | |
| 6,578,916 B2 | 6/2003 | Longhi et al. | |
| 6,592,533 B1 | 7/2003 | Yonekawa et al. | |
| 6,682,059 B1 | 1/2004 | Daniels et al. | |
| 7,131,697 B2 | 11/2006 | Beermann et al. | |
| 7,152,920 B2 | 12/2006 | Sugiyama et al. | |
| 7,537,286 B2 | 5/2009 | Walker et al. | |
| 7,663,502 B2 | 2/2010 | Breed | |
| 7,797,771 B1 * | 9/2010 | Bossen | G16H 50/30 5/4 |
| 7,865,375 B2 | 1/2011 | Lancaster et al. | |
| 7,917,264 B2 | 3/2011 | Hozumi et al. | |
| 7,967,379 B2 | 6/2011 | Walters et al. | |
| 8,054,203 B2 | 11/2011 | Breed et al. | |
| 8,251,447 B2 | 8/2012 | Fujita et al. | |
| 8,348,339 B2 | 1/2013 | Onuma et al. | |
| 8,474,908 B2 | 7/2013 | Petzel et al. | |
| 8,596,716 B1 | 12/2013 | Caruso | |
| 8,616,654 B2 | 12/2013 | Zenk et al. | |
| 8,690,249 B2 | 4/2014 | Kang et al. | |
| 8,775,018 B2 | 7/2014 | Uenuma et al. | |
| 8,872,640 B2 * | 10/2014 | Horseman | B60W 40/08 340/425.5 |
| 8,931,837 B2 | 1/2015 | Vernon | |
| 8,958,955 B2 | 2/2015 | Hotary et al. | |
| 9,049,937 B2 | 6/2015 | Walker | |
| 9,381,840 B2 | 7/2016 | Tobata et al. | |
| 2002/0056709 A1 | 5/2002 | Burt | |
| 2002/0089220 A1 | 7/2002 | Achleitner et al. | |
| 2002/0096915 A1 | 7/2002 | Haupt et al. | |
| 2002/0167486 A1 | 11/2002 | Tan et al. | |
| 2003/0023363 A1 | 1/2003 | Katz et al. | |
| 2003/0080699 A1 | 5/2003 | Rumney | |
| 2003/0226399 A1 | 12/2003 | Clingerman et al. | |
| 2005/0067868 A1 | 3/2005 | Kern et al. | |
| 2006/0061315 A1 | 3/2006 | Schmidt et al. | |
| 2006/0103193 A1 | 5/2006 | Kramer | |
| 2006/0290175 A1 | 12/2006 | Hartwich | |
| 2007/0106188 A1 | 5/2007 | Walker | |
| 2008/0009989 A1 | 1/2008 | Kim et al. | |
| 2008/0116730 A1 | 5/2008 | Connolly et al. | |
| 2008/0255731 A1 | 10/2008 | Mita et al. | |
| 2008/0267460 A1 | 10/2008 | Aoki et al. | |
| 2008/0277985 A1 | 11/2008 | Petzel | |
| 2009/0026821 A1 | 1/2009 | Macht et al. | |
| 2009/0030578 A1 | 1/2009 | Periot et al. | |
| 2009/0058661 A1 | 3/2009 | Gleckler et al. | |
| 2009/0088930 A1 | 4/2009 | Ohtsubo et al. | |
| 2009/0099490 A1 | 4/2009 | Durt et al. | |
| 2009/0107258 A1 | 4/2009 | Saitoh et al. | |
| 2010/0045087 A1 | 2/2010 | Pyun et al. | |
| 2010/0244504 A1 | 9/2010 | Colja et al. | |
| 2010/0276973 A1 | 11/2010 | Zenk et al. | |
| 2010/0283299 A1 | 11/2010 | Onuma et al. | |
| 2011/0031788 A1 | 2/2011 | Kosik et al. | |
| 2011/0112449 A1 | 5/2011 | Hopf et al. | |
| 2011/0210590 A1 | 9/2011 | Mori et al. | |
| 2012/0053794 A1 * | 3/2012 | Alcazar | B60N 2/0244 701/48 |
| 2012/0086249 A1 * | 4/2012 | Hotary | B60N 2/809 297/284.3 |
| 2012/0096960 A1 | 4/2012 | Galbreath et al. | |
| 2012/0259248 A1 | 10/2012 | Receveur | |
| 2012/0283929 A1 | 11/2012 | Wakita et al. | |
| 2013/0009761 A1 * | 1/2013 | Horseman | B60W 40/08 340/425.5 |
| 2013/0090816 A1 | 4/2013 | Huber | |
| 2013/0166078 A1 | 6/2013 | Heger et al. | |
| 2013/0175838 A1 | 7/2013 | Oshima et al. | |
| 2013/0251216 A1 | 9/2013 | Smowton et al. | |
| 2013/0313871 A1 | 11/2013 | Shalaby et al. | |
| 2014/0163333 A1 | 6/2014 | Horseman | |
| 2014/0167463 A1 | 6/2014 | Sakata et al. | |
| 2014/0319895 A1 | 10/2014 | Lange-Mao et al. | |
| 2014/0361590 A1 | 12/2014 | Line et al. | |
| 2015/0008710 A1 * | 1/2015 | Young | B60N 2/0276 297/217.3 |
| 2015/0084985 A1 | 3/2015 | Baudu | |
| 2015/0097400 A1 | 4/2015 | Heys | |
| 2015/0099245 A1 | 4/2015 | Bouchard et al. | |
| 2015/0136146 A1 | 5/2015 | Hood et al. | |
| 2015/0351692 A1 | 12/2015 | Pereny et al. | |
| 2015/0352990 A1 | 12/2015 | Zouzal et al. | |
| 2015/0367751 A1 | 12/2015 | Lamesch et al. | |
| 2016/0101710 A1 | 4/2016 | Bonk et al. | |
| 2016/0297337 A1 | 10/2016 | White et al. | |

FOREIGN PATENT DOCUMENTS

| | | |
|---|---|---|
| CN | 101161500 A | 4/2008 |
| CN | 101374695 A | 2/2009 |
| CN | 201329822 Y | 10/2009 |
| CN | 101731862 A | 6/2010 |
| CN | 201646470 U | 11/2010 |
| CN | 101992708 A | 3/2011 |
| CN | 102015362 A | 4/2011 |
| CN | 102099227 A | 6/2011 |
| CN | 102991442 A | 3/2013 |
| CN | 104044495 A | 9/2014 |
| CN | 104252615 A | 12/2014 |
| DE | 19908655 C1 | 8/2000 |
| DE | 10331624 B3 | 4/2005 |
| DE | 10353020 A1 | 6/2005 |
| DE | 102005034069 A1 | 1/2007 |
| DE | 102005038289 B3 | 3/2007 |
| DE | 102006036532 A1 | 2/2008 |
| DE | 102009021532 A1 | 11/2010 |
| DE | 102011010210 A1 | 12/2011 |
| DE | 102010056568 A1 | 7/2012 |
| DE | 102012216869 A1 | 3/2014 |
| DE | 102012216178 A1 | 5/2014 |
| EP | 0489310 A1 | 6/1992 |
| EP | 2353928 A1 | 8/2011 |
| EP | 2353928 B1 | 9/2014 |
| FR | 2988051 A1 | 9/2013 |
| FR | 2988654 A1 | 10/2013 |
| FR | 2994073 A1 | 2/2014 |
| GB | 2370222 A | 6/2002 |
| GB | 2523584 B | 1/2016 |
| TW | 477405 U | 5/2014 |
| WO | 2005074754 A1 | 8/2005 |
| WO | 2011144280 A1 | 11/2011 |
| WO | 2012159688 A1 | 11/2012 |
| WO | 2013144498 A1 | 10/2013 |
| WO | 2013170335 A1 | 11/2013 |
| WO | 2014066493 A1 | 5/2014 |
| WO | 2014085302 A1 | 6/2014 |

(56) References Cited

OTHER PUBLICATIONS

U.S. Appl. No. 14/560,487, entitled "Adjustable Seat Assembly", filed Dec. 4, 2014, 16 pages.
U.S. Appl. No. 14/869,093, entitled "Air Bladder Assembly for Seat Bottoms of Seat Assemblies", filed Sep. 29, 2015, 14 pages.
U.S. Appl. No. 14/987,026, entitled "Seat Assemblies With Adjustable Side Bolster Actuators", filed Jan. 4, 2016, 15 pages.
U.S. Appl. No. 14/716,191, entitled "Adjustable Seat Assembly", filed May 19, 2015, 24 pages.
U.S. Appl. No. 14/716,197, entitled "Adjustable Seat Assembly", filed May 19, 2015, 22 pages.
German Office Action for Application No. 10 2015 210 545.8, dated Oct. 27, 2017, 7 pages.
Chinese Office Action and English translation for Application No. 20150304898.6, dated Mar. 28, 2016, 26 pages.
Chinese Office Action for Application No. 201510304898.6, dated Jan. 4, 2018, 13 pages.
Chinese Office Action for Application No. 201510304898.6, dated Jul. 27, 2018, 12 pages.

\* cited by examiner

ADJUSTABLE SEAT ASSEMBLY

CROSS-REFERENCE TO RELATED APPLICATIONS

This application claims the benefit of U.S. provisional application Ser. No. 62/009,585 filed Jun. 9, 2014, the disclosure of which is hereby incorporated in its entirety by reference herein.

TECHNICAL FIELD

Various embodiments relate to adjustable seat assemblies.

BACKGROUND

An adjustable seat assembly is illustrated and described in U.S. Pat. No. 5,758,924, which issued on Jun. 2, 1998 to Lear Corporation.

SUMMARY

According to at least one embodiment, a seat assembly is provided with a seat cushion adapted to be mounted for translation. A seat back is adapted to be pivotally mounted adjacent the seat cushion. An actuator is operably connected to at least one of the seat cushion and the seat back for adjustment of a plurality of settings of the seat assembly. A controller is in electrical communication with the actuator and is configured to receive input indicative of occupant anthropometry data, current physical condition and/or activity level, compare the input with predetermined data ranges, and adjust at least one of the plurality of settings of the actuator to a predetermined setting based on the predetermined range.

According to at least another embodiment, a computer-program product is embodied in a non-transitory computer readable medium that is programmed for automatically adjusting a seat assembly. The computer-program product comprises instructions for receiving input indicative of at least one of occupant anthropometry data, current physical condition and activity level. The input is compared with predetermined data ranges. An actuator is adjusted to a predetermined setting based on the predetermined range.

According to at least another embodiment, a method for adjusting a seat assembly receives anthropometry data for an occupant. The anthropometry data of the occupant is compared to predetermined ranges of anthropometry data. The seat assembly is adjusted to a preferred seating adjustment for the associated range of anthropometry data.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

A comfort, posture and wellness seating system for vehicle seat assemblies provides a visual interface with adjustment hardware organically or inorganically. The system may be employed to properly configure any new or existing seating system. The system can also address specific comfort, posture and wellness needs or preferences, such as thoracic support. The seating system objectifies comfort data and biomechanical knowledge to make the data transferable.

The comfort, posture and wellness seating system integrates anthropometry, bio-mechanics, and historical seating comfort data. The seating system can be employed in original equipment for vehicles or in aftermarket products. Applicable markets include automotive, mass transit, airlines, etc., as well as non-vehicular seating such as office, home, commercial, and public venue seating.

Figure 1:
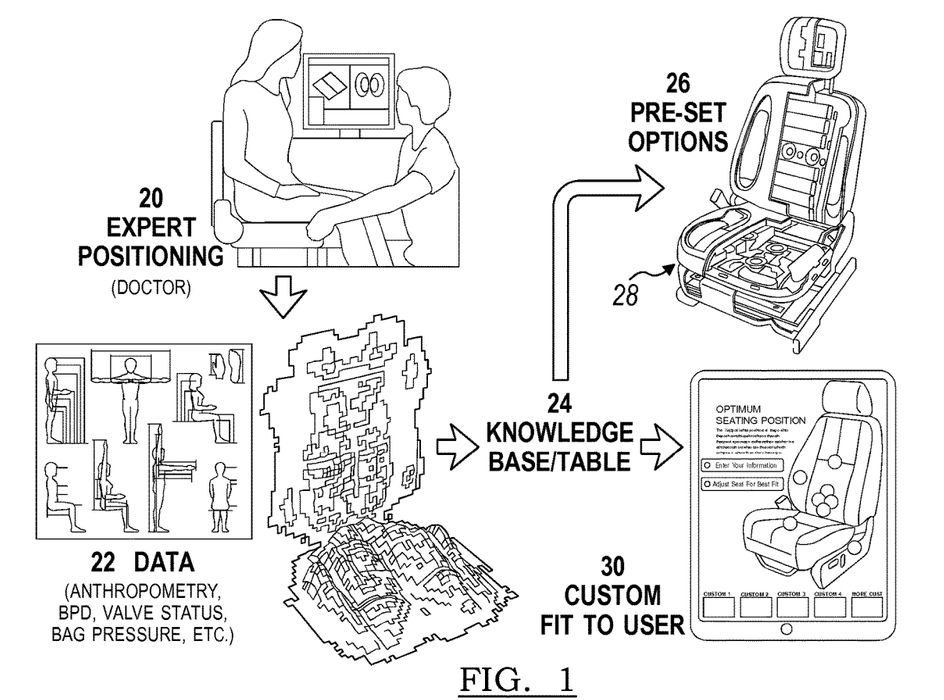
FIG. 1 is a flowchart of a method for determining various adjustment positions of a vehicle seat assembly for various users, according to an embodiment.

Referring now to FIG. 1, a flowchart of a method for determining various adjustment positions of a vehicle seat assembly for various users is illustrated, according to an embodiment. Data collection may occur at block 20. The data collection 20 may include expert positioning of a suitable sample of occupants for optimal comfort, posture and/or wellness by a doctor or chiropractor. The data collection 20 can be used at specific sites on an ongoing basis if required. The expert input provides a high level of expert comfort, posture and wellness fitting.

The data 22 may be based on anthropometry, body pressure distribution (BPD), status of actuators (such as pressure of inflatable air bladders, status of valves or the like), or other data that provides a comfort, posture and wellness position of an adjustable vehicle seat assembly. The data is collected in a knowledge base 24 or table for setting adjustments based on categories of data. The knowledge base 24 may be compiled from the expert positioned data 20 and the occupant specific data 22. The setting adjustments from the knowledge base 24 are utilized for pre-set options 26 in a vehicle seat assembly 28. The setting adjustments 24 can be customized by a user at a controller or display 30.

Figure 2:
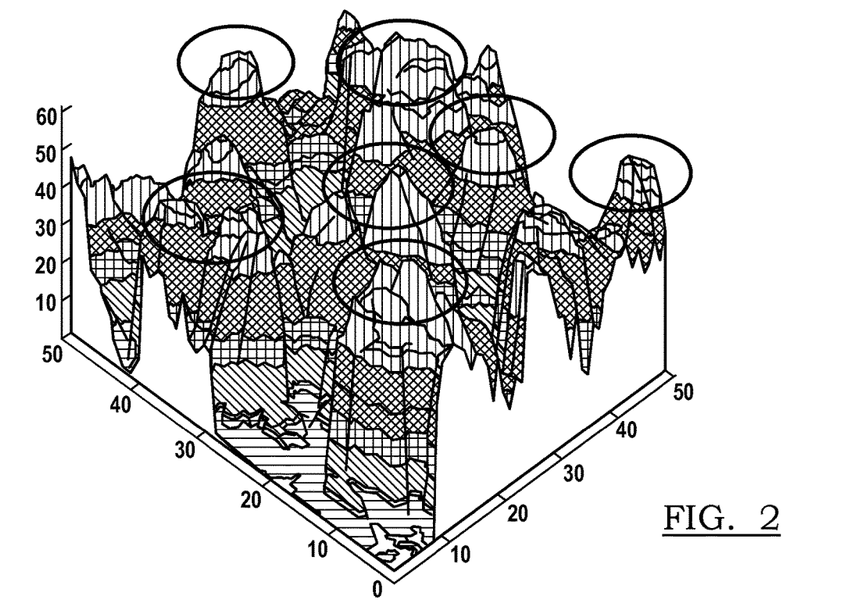
FIG. 2 is a graph of data collected in the method of FIG. 1.

Referring to FIG. 2, input data 20, 22 can be plotted versus adjustment settings 20, 24 for high level categorization. The settings 20, 24 can be categorized by topology clustering for setting the pre-set options 26. Various setting options 26 may be provided for various types of driving. For example a touring setting may provide per package settings and basic comfort, posture and wellness recommendations. The touring setting may also provide optimal visibility, use of features and controls, and the like. A performance setting may be provided for active drivers to provide a more erect position with firmer seating. Additionally, a luxury setting may be more reclined with softer seating.

Figure 3:
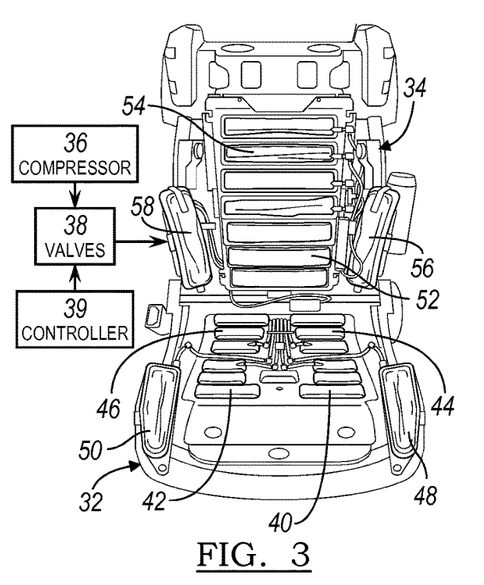
FIG. 3 is a front perspective view of a vehicle seat assembly, illustrated partially disassembled, according to an embodiment.

FIG. 3 illustrates the vehicle seat assembly 28 with a cover removed. The seat assembly 28 includes a seat cushion 32 adapted to be mounted for motor-driven adjustable translation in a fore and aft direction and in an up and down direction of a vehicle. The seat assembly 28 includes a seat back 34 pivotally connected to the seat cushion 32 to extend generally upright relative to the seat cushion 32 for motor-driven pivotal adjustment relative to the seat cushion 32. A head restraint (not shown) is mounted for motor-driven adjustable translation to the seat back 34.

At least one compressor 36 provides a source of air to the seat assembly 28. A plurality of valves 38 receive the compressed air and are controlled by a controller 39 for regulating compressed air into and out of the seat assembly 28. The seat cushion 32 includes a forward left air bladder 40, a forward right air bladder 42, a rear left air bladder 44, a rear right air bladder 46, a left side bolster air bladder 48, and a right side bolster air bladder 50. The seatback 34 includes a plurality of lumbar air bladders 52, a plurality of thoracic air bladders 54, a left side bolster air bladder 56, and a right side bolster air bladder 58. The valves 38 may be provided as a common valve bank that is housed in the seat back 34 or under the seat cushion 32; or the valves 38 may each be provided on each of the air bladders 40, 42, 44, 46, 48, 50, 52, 54, 56, 58. The compressor 36 may be provided in the seat back 34, the seat cushion 32 or concealed within the vehicle body. The controller 39 may be provided in a module under the seat cushion 32, and may be a multifunction controller that also controls other functions in the vehicle.

It is believed that supporting the thoracic region of the spine can reduce forces and support as much as one-third of the upper body mass. By increasing support of the upper body mass, loads are reduced on the muscles, ligaments, vertebrae and discs in the spine and pelvic regions. Decreased load reduces fatigue on these areas of the body. The thoracic air bladders 54 are adjustable to provide the right degree of support in the correct location necessary to reduce such loading.

The controller 39 receives the adjustment settings 24 from pre-set data 26 or from customized data 30. The data may be input from an interface that is provided in the vehicle. The interface may be integrated into the vehicle, such as an instrument panel display that is in suitable wired or wireless communication with the controller 39. The interface may be remote, such as a personal digital assistant (PDA) including phones, tablets and the like. The interface may be provided as a smart phone application, wherein users enter relevant information about themselves. The smart phone interface may not require on-site expertise or seat properties. The remote interface permits a user to transport settings to each vehicle, such as personal passenger vehicles, airline seating, rental cars, and the like.

Figure 4:
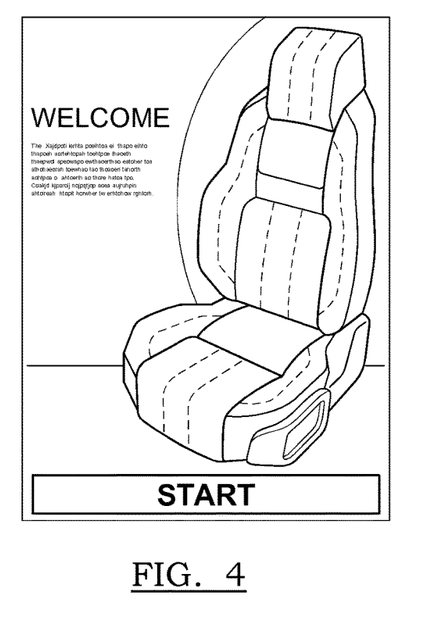
FIG. 4 is a display image for a vehicle seating system according to an embodiment.
Figure 5:
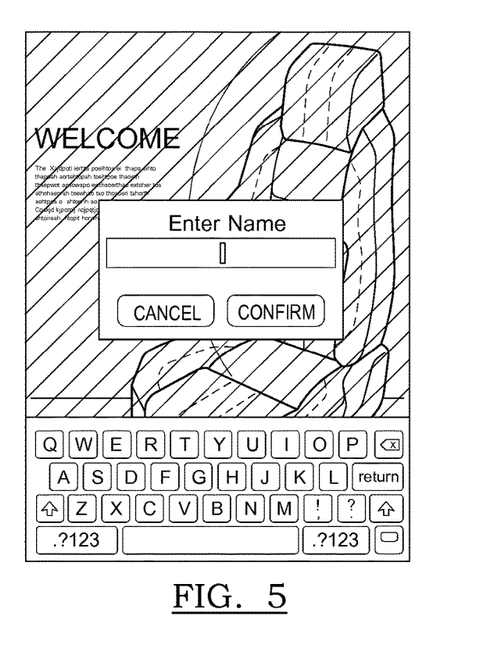
FIG. 5 is another display image for the vehicle seating system of FIG. 4.
Figure 6:
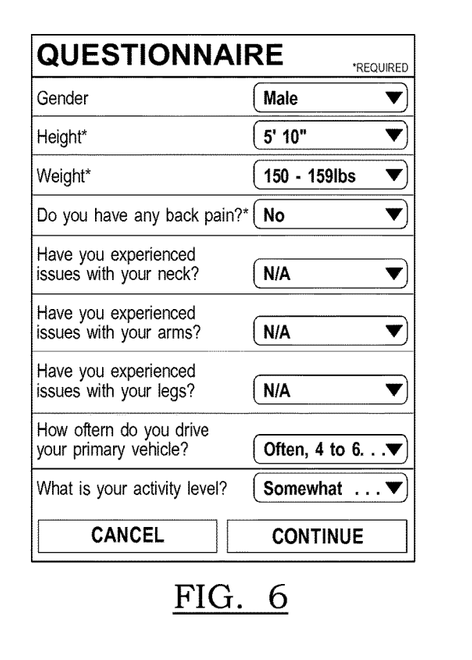
FIG. 6 is another display image for the vehicle seating system of FIG. 4.

FIGS. 4-9 illustrate display images from an interface, such as a tablet. FIG. 4 illustrates a welcome screen wherein a data collection process is initiated. FIG. 5 illustrates a screen wherein a user name is input to identify the user. FIG. 6 illustrates another input screen wherein biometric and personal health data, such as wellness and activity level, is collected. This data is utilized to adjust the seat to the pre-set options 26, based on prior-collected data 22 in knowledge base 24.

Figure 7:
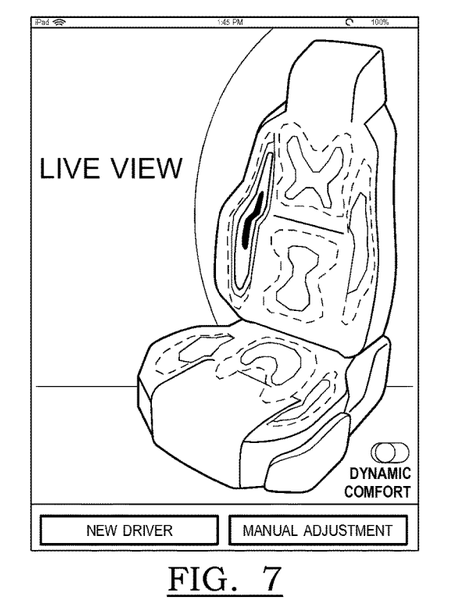
FIG. 7 is another display image for the vehicle seating system of FIG. 4.
Figure 8:
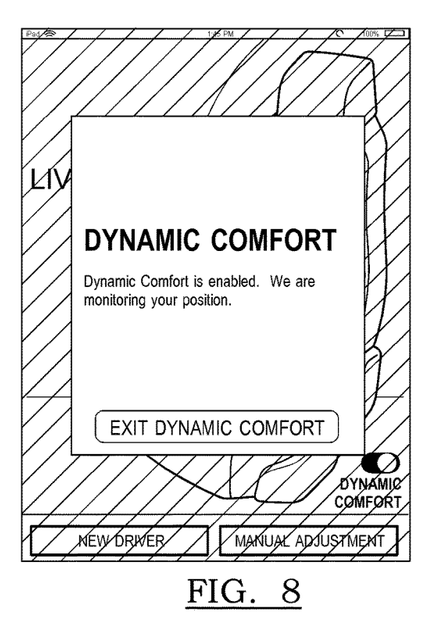
FIG. 8 is another display image for the vehicle seating system of FIG. 4.
Figure 9:
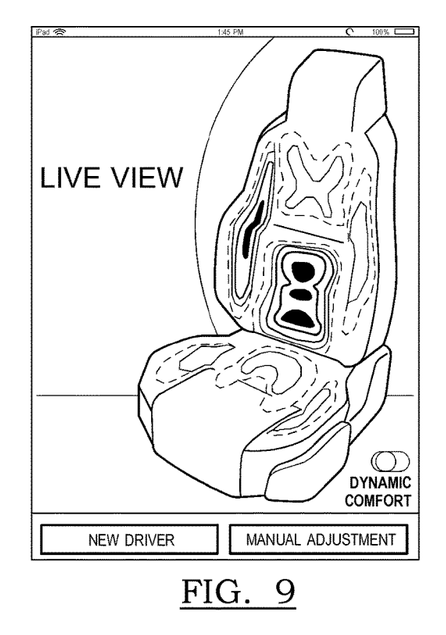
FIG. 9 is another display image for the vehicle seating system of FIG. 4.

Each of the air bladders 40, 42, 44, 46, 48, 50, 52, 54, 56, 58 may include a pressure sensor to detect air pressure in the respective bladder 40, 42, 44, 46, 48, 50, 52, 54, 56, 58. Any pressure sensor is contemplated, such as a pneumatic pressure sensor at the outlet valve of each respective air bladder 40, 42, 44, 46, 48, 50, 52, 54, 56, 58. Pressure can also be sensed by contact pressure sensors disposed in front of or behind some or all of the respective air bladders, including on a front or rear surface thereof. The contact pressure sensors may include pressure-sensing mats, such as those available by Tekscan®, Inc. of 307 West First Street. South Boston, Mass. 02127-1309, USA. FIG. 7 illustrates a depiction of the vehicle seat assembly 28 with zones ranging in color to depict a distribution of pressure upon the seat. This visualization may assist an occupant in positioning upon the seat assembly 28 with live visual feedback.

A dynamic comfort, posture and wellness option is offered. Selection of the dynamic comfort option measures the pressure in the sensors at FIG. 8, and displays a live view as in FIG. 9. The controller 39 compares the sensor values, and if the controller 39 determines that the occupant is not seated evenly, the controller 39 balances the air pressure in opposing air bladders to balance the occupant seating position.

Figure 10:
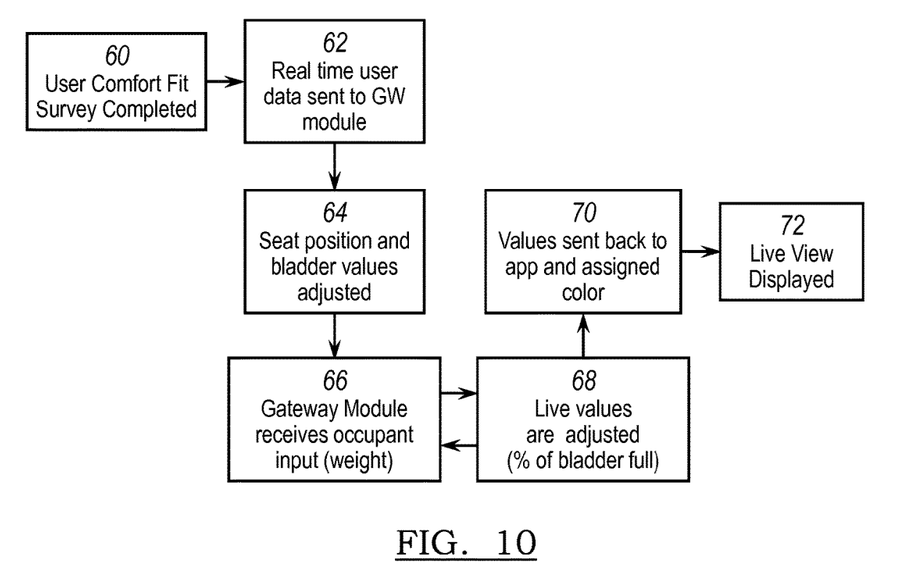
FIG. 10 is a flowchart of a portion of an overall method for adjusting a vehicle seat assembly according to an embodiment.
Figure 11:
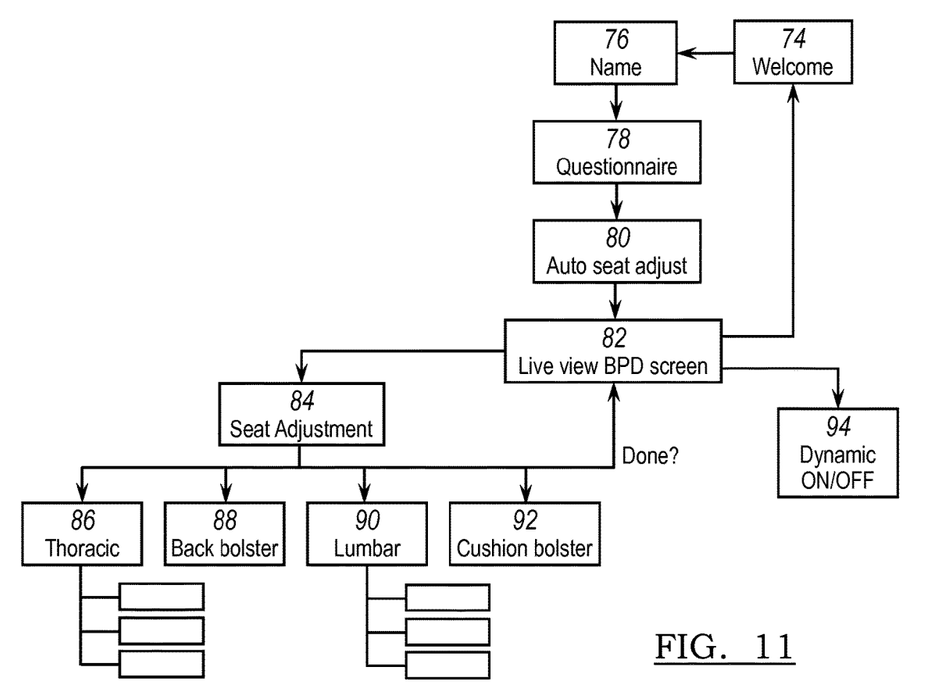
FIG. 11 is a flowchart of another portion of an overall method for adjusting a vehicle seat assembly according to another embodiment.

FIG. 10 depicts a flowchart for a method for adjusting the seat assembly 28 according to an embodiment. At block 60 the user comfort fit survey is completed. This process may be performed in an application on a PDA, tablet or smartphone, or in a controller in the vehicle. At block 62, real time user data is sent to a gateway module, or controller 39. In block 64, the seat assembly 28 is positioned, and the air bladder values are adjusted. At block 66, the gateway module receives an occupant weight distribution from the air bladder pressure sensors. At block 68 live values are adjusted, such as a percentage of bladder fullness. At block 70, the values are sent to the interface application, and the range of values is assigned a range of colors. In block 72, a live view is displayed, as in FIG. 9. Steps 66 and 68 are repeated for dynamically adjusting the seat assembly 28 to the occupant's position. Steps 66, 70 and 72 are repeated incrementally to provide the live view of the pressure distribution.

FIGS. 11-14 depict flowcharts for a method for adjusting the seat assembly 28 according to another embodiment. At block 74 a welcome screen initiates a data collection process. At block 76 a user name is input to identify the user. At block 78 another input screen includes a questionnaire wherein biometric and personal health data, such as wellness and activity level is collected. This data is utilized to adjust the seat at block 80 to the pre-set options 26, based on prior-collected data 22 in knowledge base 24. At block 82, a depiction of the vehicle seat assembly 28 is provided with zones ranging in color to depict a distribution of pressure upon the seat assembly 28. If manual adjustment is selected at block 84, the occupant can select a zone of the seat for adjustment, such as thoracic 86, back bolster 88, lumbar 90 and cushion bolster 92. Once manual adjustment is completed, the live view body pressure distribution (BPD) screen 82 is updated. If a dynamic mode is selected at block 84, then the adjustments and live view are updated based on the measurements from the pressure sensors and the biometric data.

Figure 12:
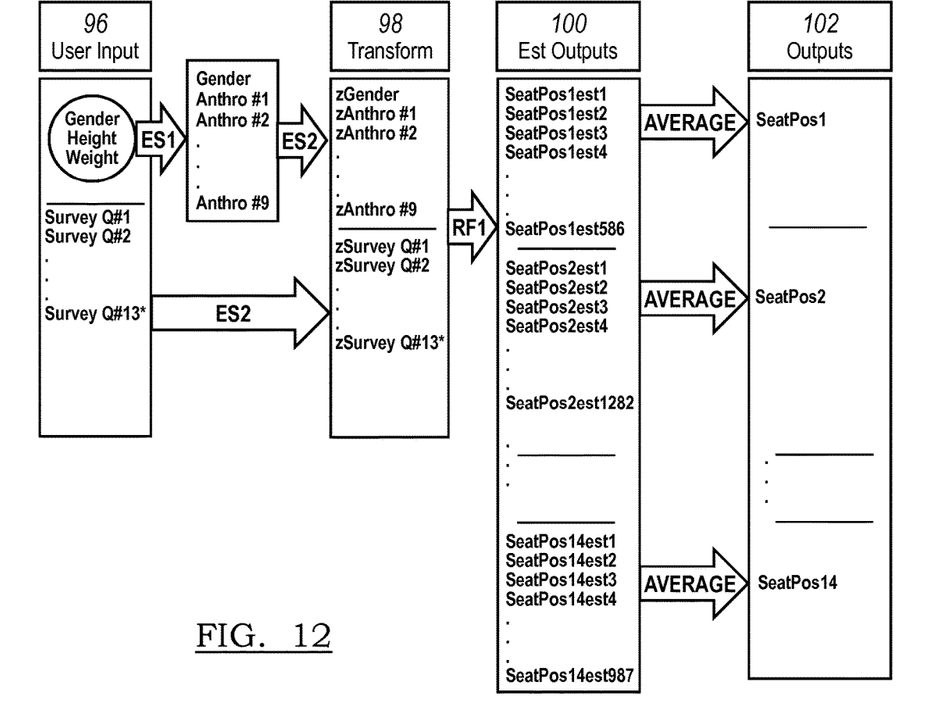
FIG. 12 is a flowchart of another portion of an overall method for adjusting a vehicle seat assembly according to another embodiment.

FIG. 12 more specifically illustrates a flow chart for a method for adjusting the seat assembly 28 according to another embodiment. The method employs an initial or crowd-sourced, position model, wherein user input data is collected at block 96. The model employs a plurality of if—then equations where each (transformed) input, block 98, finds a large number of combinatorial if—then fits to give an estimate of a seat position (e.g., horizontal position) block 100 for seat adjustment 102. For example, there is a vast plurality of possible estimates, for seat lift, but each set of user inputs will only match a finite number and produce an estimate.

Figure 13:
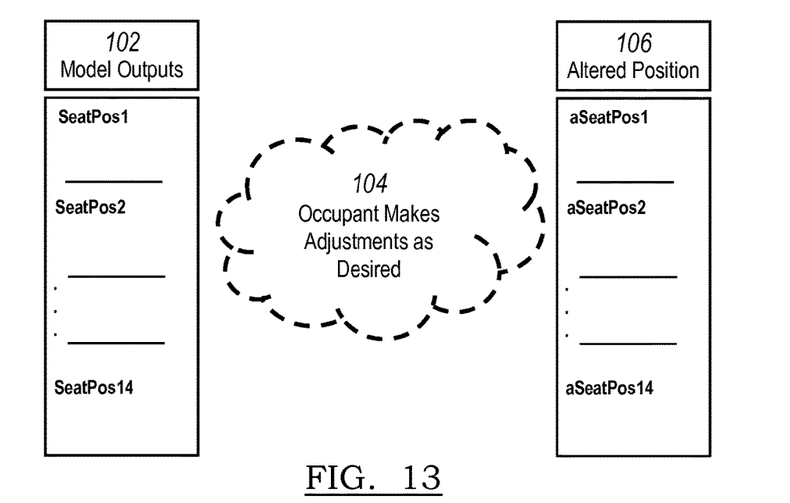
FIG. 13 is a flowchart of another portion of an overall method for adjusting a vehicle seat assembly according to another embodiment.

FIG. 13 illustrates another portion of the method wherein the model outputs 102 are adjusted by the user 104 to provide customized user settings 106. The crowd sourced model outputs 102 provide an initial adjustment based on the collected data which can thereby permit user customization with minimal effort in adjusting the positions from predicted model outputs 102, instead of full adjustment from a reset position. The initial adjustments can be of seat cushion height, tilt, and fore-aft position, seat back recline angle, headrest position (up-down and/or fore-aft), and bladder inflations. Some or all of the foregoing can then be user customized.

Figure 14:
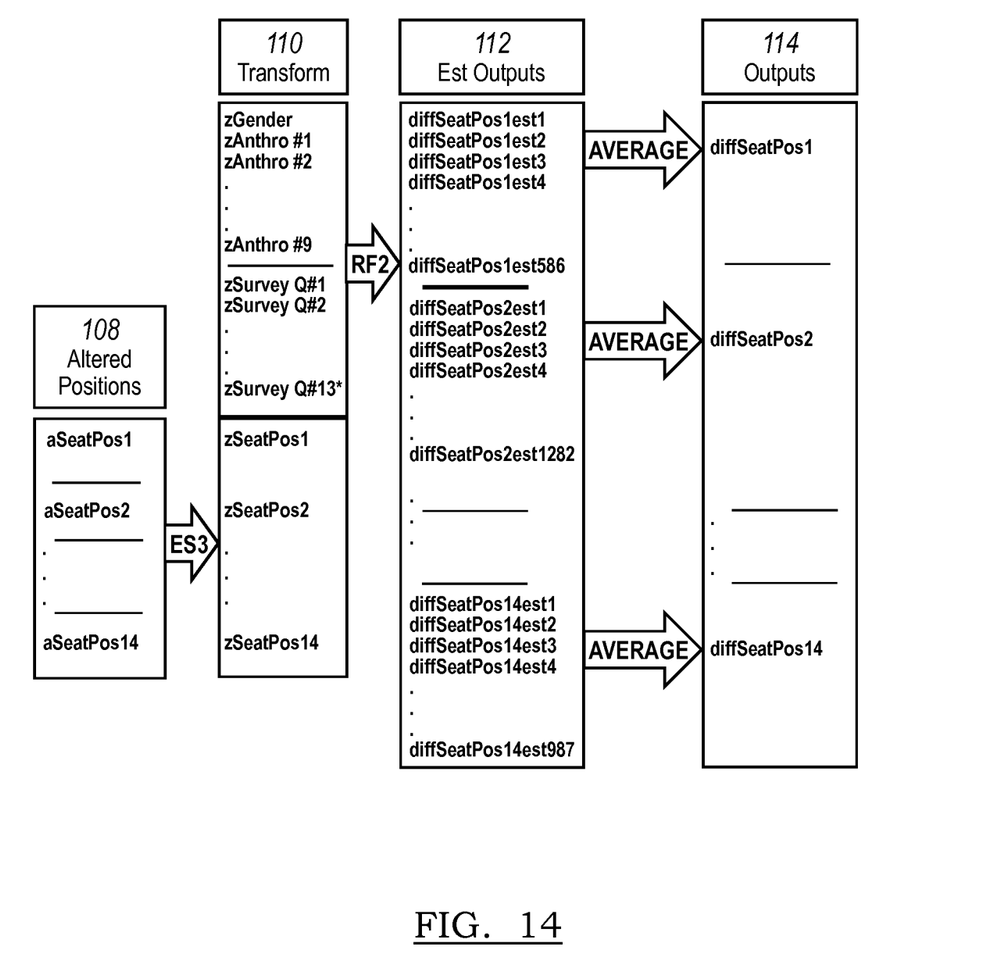
FIG. 14 is a flowchart of another portion of an overall method for adjusting a vehicle seat assembly according to another embodiment.

FIG. 14 illustrates another portion of the embodiment of a method for adjustment of the seat assembly 28. From block 108, the altered positions are transformed, block 110, to estimated outputs 112 from the wellness expert position model to adjusted seat positions at block 114.

While various embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A seat assembly comprising:
a seat cushion adapted to be mounted for translation;
a seat back adapted to be pivotally mounted adjacent the seat cushion;
at least one actuator operably connected to at least one of the seat cushion and the seat back for adjustment of at least one of a plurality of settings of the seat assembly;
a controller in electrical communication with the at least one actuator and configured to:
receive input indicative of occupant anthropometry data,
select a predetermined data range associated with the input indicative of occupant anthropometry data, and
adjust at least one of the plurality of settings of the seat assembly to a predetermined setting based on the selected predetermined data range;
wherein the at least one actuator comprises:
a compressor in electrical communication with the controller,
a plurality of valves in electrical communication with the controller and in fluid communication with the compressor, and
a plurality of air bladders in fluid communication with the plurality of valves;
wherein the plurality of air bladders comprises individually inflatable left side air bladders and individually inflatable right side air bladders;
a plurality of sensors operably connected to at least one of the seat cushion, the seat back, and a head restraint to detect a seating position of an occupant; and
wherein the plurality of sensors comprises:
at least one left side sensor, and
at least one right side sensor;
wherein the controller is further configured to:
output a questionnaire to a media device, and
receive the input indicative of the occupant anthropometry data from the media device in response to the questionnaire;
wherein the at least one actuator is manually adjustable;
wherein the input indicative of occupant anthropometry data comprises at least one of occupant height and occupant weight and
wherein the controller is further configured to:
receive input indicative of a manual adjustment to the at least one actuator,
compare the manual adjustment to biomechanically optimized data, and
adjust the at least one actuator to a setting corresponding to a predetermined range of biomechanically optimized data associated with the occupant anthropometry data in response to the input indicative of the manual adjustment.

2. The seat assembly of claim 1 wherein the controller is further configured to:
receive input indicative of current physical condition; and
adjust at least one of the plurality of settings of the at least one actuator to a predetermined setting based on a predetermined data range associated with the current physical condition.

3. The seat assembly of claim 1 wherein the controller is further configured to:
receive input indicative of activity level; and
adjust at least one of the plurality of settings of the at least one actuator to a predetermined setting based on a predetermined data range associated with the activity level.

4. The seat assembly of claim 1 wherein the predetermined data ranges comprise biomechanically optimized data.

5. The seat assembly of claim 1 wherein the predetermined data ranges comprise a table of anthropometry data ranges collected from a plurality of surveyed persons.

6. The seat assembly of claim 1 wherein the at least one actuator comprises a motor-driven height adjustment mechanism.

7. The seat assembly of claim 1 wherein the at least one actuator comprises a motor-driven fore-aft adjustment mechanism.

8. The seat assembly of claim 1 wherein the at least one actuator comprises a motor-driven head restraint adjustment mechanism.

9. The seat assembly of claim 1 wherein the at least one actuator comprises:
a motor-driven height adjustment mechanism;
a motor-driven fore-aft adjustment mechanism; and
a motor-driven head restraint adjustment mechanism.

10. A computer-program product embodied in a non-transitory computer readable medium that is programmed for automatically adjusting a seat assembly, the computer-program product comprising instructions for:
   receiving input indicative of occupant anthropometry data;
   selecting a predetermined data range associated with the input indicative of occupant anthropometry data; and
   adjusting an actuator to a predetermined setting based on the selected predetermined range;
   outputting a questionnaire to a media device;
   receiving the input indicative of the occupant anthropometry data from the media device in response to the questionnaire;
   wherein the input indicative of occupant anthropometry data comprises at least one of occupant height and occupant weight
   receiving input indicative of a manual adjustment to the actuator;
   comparing the manual adjustment to biomechanically optimal data; and
   adjusting the actuator to another predetermined setting based on the biomechanically optimal data associated with the occupant anthropometry data in response to the input indicative of the manual adjustment.

11. A method for adjusting a seat assembly comprising steps of:
   obtaining predetermined data ranges from biomechanically optimized data provided by a posture expert;
   receiving anthropometry data for an occupant;
   selecting a predetermined data range associated with the anthropometry data for the occupant; and
   adjusting the seat assembly to a preferred seating adjustment for the selected predetermined data range; and
   wherein the anthropometry data comprises at least one of occupant height and occupant weight.

* * * * *

UNITED STATES PATENT AND TRADEMARK OFFICE
CERTIFICATE OF CORRECTION

PATENT NO. : 10,328,823 B2
APPLICATION NO. : 14/560436
DATED : June 25, 2019
INVENTOR(S) : Terry O'Bannon et al.

Page 1 of 1

It is certified that error appears in the above-identified patent and that said Letters Patent is hereby corrected as shown below:

In the Claims

Column 8, Lines 7-17, Claim 11:
Delete:
"11. A method for adjusting a seat assembly comprising steps of:
 obtaining predetermined data ranges from biomechanically optimized data provided by a posture expert;
 receiving anthropometry data for an occupant;
 selecting a predetermined data range associated with the anthropometry data for the occupant; and
 adjusting the seat assembly to a preferred seating adjustment for the selected predetermined data range; and
 wherein the anthropometry data comprises at least one of occupant height and occupant weight."

And Insert:
-- 11. The computer-program product of claim 10 further comprising instructions for obtaining the predetermined data ranges from biomechanically optimized data provided by a posture expert. --

Signed and Sealed this
Third Day of March, 2020

Andrei Iancu
*Director of the United States Patent and Trademark Office*